Patented Feb. 6, 1951

2,540,599

UNITED STATES PATENT OFFICE 2,540,599

CATALYST FOR THE SYNTHESIS OF HYDROCARBONS

Marnell A. Segura, Denham Springs, La., assignor to Standard Oil Development Company, a corporation of Delaware No Drawing. Application November 9, 1946, Serial No. 708,940

2 Claims. (Cl. 260—449.6)

The present invention is concerned with improved catalysts. The invention is more particularly concerned with improved hydrocarbon synthesis catalysts selected from the group consisting of iron, cobalt and nickel. In accordance with my invention catalysts which are highly resistant to attrition and disintegration are prepared by incorporating an active catalyst ingredient in a thermosetting material.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica, and alumina. Promoters, such as oxides of sodium, potassium, chromium, zinc, aluminum, magnesium and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 750° F. The pressures, likewise, vary considerably and are a function of other operating conditions, such as catalyst employed, activity of the catalyst, character of the feed gases and the temperature utilized. Pressures in the range from about 1 to 100 and higher atmospheres have been suggested. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized, 1/1 to 4/1 molal ratio of hydrogen and carbon monoxide in the feed synthesis gases is desirable.

The synthesis gases comprising hydrogen and carbon monoxide are produced by various procedures. Methane or natural gas may be oxidized with a reducible metal oxide, with pure oxygen or with gases comprising oxygen. Other feed stocks may comprise coal, shale and other hydrocarbons. The reaction may be conducted in a single or in a plurality of stages. For example, one procedure is to employ a two-stage reforming process using steam and carbon dioxide for the production of carbon monoxide and hydrogen. When employing methane as feed gas and reducing the same with a reducible metal oxide, the reactions are generally conducted at temperatures in the range from about 1400° F. to about 2000° F. When the synthesis gases are produced, by utilizing oxygen and natural gas, the temperatures in the reaction zone are usually in the range from about 2000 to about 3000° F.

It is also known in the art to contact gases and solids by passing the gases upwardly through an enlarged treating zone, containing a body of finely divided solids to be contacted, at a controlled velocity to maintain the solids in the treating zone in a quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate. In fluidized operations, the solid subdivided particles generally have particle sizes in the range from about 0 to 200 microns and higher. These particles are maintained in a fluid ebullient state in the reaction zone by means of upflowing suspending gases, the velocity of which is in the range from about 0.1 to 5 feet and higher per second.

My invetion finds specific application in a hydrocarbon synthesis reaction wherein the synthesis gases are reacted by means of a suitable catalyst to form hydrocarbon constituents containing more than one carbon atom in the molecule. For example, in this process one of the important problems confronting the development of the synthesis process is that carbon builds up on the catalyst to an extent that the catalyst is lost unless it is regenerated. Although, a certain amount of carbon may be desirable on the catalyst surface, this factor must be controlled. As the carbon accumulates on the catalyst it disintegrates into finer particles. For example, catalyst containing no 0–20 micron material and 75% of 80+ micron fraction will be altered in 200 hours to 50% of 0-20 micron material and 10% of 80+ material. The finer material contained the most carbon, 50%, compared to 20% for the coarse.

In accordance with my invention, I prepare catalysts which are less subject to deterioration and attrition due to carbonization. By employing my catalysts, a more uniform product is secured for a longer period of time. My catalysts comprise an active catalyst ingredient disposed in a thermosetting material. The catalysts of my invention are appreciably more resistant to disintegration as a result of carbonization and other causes.

The active catalytic ingredient may be any active catalyst, but is preferably a metal selected from the group consisting of iron, cobalt and nickel. The active catalytic material is placed on an inert support such as a thermosetting plastic powder, or other polymerizing compound which, when heated, will be transformed into a stable solid polymer.

The process of my invention may be more readily understood by the following examples illustrating the same.

Example 1

A sintered pyrites ash powder was ground to pass 325 mesh. The powder was impregnated with a solution of potassium carbonate and dried. The dried powder was mixed with finely ground alumina powder. The final proportions of this mixture were:

|  | Percent |
|---|---|
| Iron | 95.5 |
| Potassium oxide | 1.5 |
| Alumina | 3.0 |

This mixture was milled into a polymer comprising butadiene, 85% and styrene, 15%. The final mixture comprised 50% active material as iron. A milled sheet of this material, approximately ¼" thick, was heated in a muffle furnace in an atmosphere of nitrogen at 470° F. for 4 hours and at 520° F. for 18 hours. The resulting product was iron oxide imbedded in a resin which was hard and firm.

This catalyst was reduced with hydrogen at 900° F. for 6 hours employing 1000 volumes of hydrogen per volume of catalyst per hour. The resulting product was firm and granular.

Example 2

The catalyst prepared as described in Example 1 was utilized in three operations for the synthesis of hydrocarbons. The operating conditions and results are tabulated below:

|  | Operation | | |
|---|---|---|---|
|  | A | B | C |
| Temp., °F | 600 | 600 | 600 |
| Feed H₂ to CO Ratio | 1.17 | 2.05 | 1.17 |
| Yields¹ | 215 | 196 | 209 |

¹ C. c. of hydrocarbon containing four carbon atoms in the molecule and higher boiling constituents per cubic meter of H₂ and CO consumed.

Example 3

A catalyst was prepared by mixing a phenol formaldehyde resin powder with finely ground, sintered iron pyrites. The pyrites was promoted with 3% alumina and 1½% potassium carbonate. The proportions of the respective materials selected were such that the finished material had about 50% iron. The materials were mixed and then put into a suitable compression mold and subjected to a pressure in the range from about 2000 to 4500 pounds per square inch. The temperature employed was in the range from about 300° F. to 400° F. These conditions were maintained on the mold until the plastic was "cured." The "set" or "cured" plastic was ground to size and reduced with hydrogen at a temperature in the range from 500° F. to 1100° F.

My invention generally comprises catalysts and their method of preparation, which catalysts are resistant to disintegration. My catalysts comprise an active ingredient disposed in a thermosetting material.

Although my process may be applied to the preparation of catalysts, generally, it is specifically applicable to the preparation of hydrocarbon synthesis catalysts, which catalysts are subject to excessive carbonization under the conditions existing in the hydrocarbon synthesis zone. Specific catalysts are selected from the group consisting of iron, cobalt and nickel. The amount of active material in my final catalyst is preferably in the range from about 20% to 70%. Particularly desirable catalysts comprise catalysts, the composition of which comprises from 40% to about 60% of the active ingredient.

The method of curing or setting the plastic may comprise any suitable known technique. In general, the plastic is cured by subjecting the same to a temperature in the range from about 300° to 800° F. and at pressures in the range from about 1500 pounds per square inch to 5000 pounds per square inch and higher. Desirable temperatures for curing are somewhat in the range from 300° to 400° F. Preferred pressures are in the range from about 2000 pounds per square inch to 4500 pounds per square inch. The conditions, however, may be varied. For example, when curing a polymer comprising 85% butadiene and 15% styrene, it is preferred to cure in two stages. The polymer is maintained at a temperature of about 450° F. to 500° F. for 2 to 6 hours in the initial stage and at a temperature in the range from 510° F. to 540° F. for a period of from 12 to 24 hours in the secondary stage. It is preferred that these curing operations be conducted in an inert atmosphere as for example, in the presence of a nitrogen atmosphere.

The catalyst may be reduced with hydrogen or hydrogen containing gas at suitable conditions. Temperatures in the range from about 600° F. to 1200° F. are employed. However, if the catalyst is reduced and used below about 700° F. the resin will not readily decompose and will serve as an efficient binder for the active iron particles. On the other hand, if the catalyst is reduced above about 700° F. the resin becomes changed into an attrition resistant carbonaceous base which serves as an efficient binder for the active material.

The thermosetting material may comprise a wide variety of substances. Suitable substances are for example, a polymer comprising 85% butadiene and 15% styrene, a polymer comprising 75% butadiene and 25% styrene, a polymerized butadiene, polymers prepared by mass polymerization or emulsification, polymerization processes involving butadiene and styrene, and cyclizing polymers which are produced by heating polymers comprising butadiene and styrene at temperatures in the range from 400° F. to 600° F. in an atmosphere of nitrogen. Other satisfactory materials are phenol-formaldehyde resins. Other materials which are satisfactory comprise urea formaldehyde resins and methyl methacrylate resins.

I claim:

1. In a hydrocarbon synthesis process wherein feed gases containing carbon monoxide and hydrogen are contacted under synthesis conditions in a synthesis zone with a catalyst consisting essentially of iron particles, the improvement in the operation tending to retard the fragmentation of the catalyst caused by forces accompanying the deposition of carbonaceous material thereon which comprises contacting the said feed gases with the said iron particles bonded together by an organic thermosetting resinous material to form a catalyst body resistant to said fragmentation.

2. An active hydrocarbon synthesis catalyst consisting essentially of powdered sintered and reduced pyrites ash and promotional amounts of a potassium compound and aluminum oxide, the relative amounts of the active ingredients being approximately 95.5% iron, 3% $Al_2O_3$ and 1½% of the potassium compound selected from the class consisting of $K_2O$ and $K_2CO_3$, intermixed with a strength imparting thermally set resinous material.

MARNELL A. SEGURA.

REFERENCES CITED

The following references are of record in the file of this patent:

UNITED STATES PATENTS

| Number | Name | Date |
| --- | --- | --- |
| 1,226,620 | Ellis | May 15, 1917 |
| 1,369,013 | Ellis | Feb. 22, 1921 |
| 1,801,382 | Wietzel et al. | Apr. 21, 1931 |
| 2,244,196 | Herbert | June 3, 1941 |
| 2,257,293 | Dreyfus | Sept. 30, 1941 |
| 2,284,468 | Burk et al. | May 26, 1942 |
| 2,350,759 | Hilmer et al. | June 6, 1944 |
| 2,396,629 | Alfthan et al. | Mar. 19, 1946 |